3,049,449
LIGHTWEIGHT ADSORBENT CLAY PRODUCT AND METHOD OF MAKING SAME

Aldo P. Allegrini, Westfield, N.J., assignor to Minerals & Chemicals Philipp Corporation, a corporation of Maryland
No Drawing. Filed Mar. 29, 1960, Ser. No. 18,236
14 Claims. (Cl. 131—17)

The present invention relates to a novel adsorbent material produced from certain clay, especially attapulgite clay, and to the method of preparation thereof. The invention relates also to tobacco preparations containing the novel adsorbent material.

The invention has for its principal object the provision of a novel lightweight adsorbent material, useful especially as an ingredient in smoking tobacco preparations to reduce the tar content of the tobacco smoke.

Attapulgite is the chief mineral constituent of Georgia-Florida fuller's earth and is a complex hydrated magnesium aluminum silicate. The structure of the clay mineral attapulgite differs from that of other familiar clays, such as kaolin clay and bentonite clay which have a micaceous sheetlike structure. Attapulgite is a colloidally dimensioned mineral having an acicular or lathlike structure. In the raw attapulgite clay, the ultimate colloidally dimensioned acicular particles are oriented in a random brush-heap fashion. The particles are so small they can be discerned only in an electron microscope. The attapulgite crystal is composed of chains of silica tetrahedrons linked together by octahedral groups of oxygens and hydroxyls containing aluminum and magnesium atoms. A typical chemical analysis of attapulgite clay is as follows:

| | |
|---|---|
| Total volatile matter, wt. percent | 19.93 |
| Free moisture, wt. percent | 12.10 |
| Volatile free basis, wt. percent: | |
| $SiO_2$ | 68.43 |
| $Al_2O_3$ | 12.56 |
| $Fe_2O_3$ | 4.94 |
| $MgO$ | 9.82 |
| $CaO$ | 1.67 |
| $K_2O$ | 0.70 |
| $Na_2O$ | 0.25 |
| $TiO_2$ | 0.60 |
| Others | 1.03 |

The term "free moisture" (F.M.) as used herein refers to the weight percent of a material eliminated when the material is heated substantially to constant weight at 220° F. The term "volatile matter" (V.M.) refers to the weight percent of a material eliminated when the material is heated substantially to constant weight at about 1700° F. In the case of raw clay, volatile matter is chiefly water.

The present invention is a result of the discovery that a novel fiberlike, lightweight magnesium aluminum silicate product, useful especially as an ingredient of tobacco preparations, can be prepared from attapulgite clay, but not from the micaceous-type clays such as kaolin and bentonite clays, by a "wet" process hereafter described.

Broadly stated, the method of the present invention comprises the initial step of dispersing a colloidal grade of attapulgite clay in water to separate substantially completely the aggregates of clay into ultimate colloidally dimensioned acicular attapulgite particles, utilizing a deflocculant for the clay in an amount sufficient to deflocculate the dispersion. The fluid deflocculated slip thus produced is dried to a grindable consistency by evaporation of water therefrom. An essential feature of the present process is that the evaporation of the fluid slip is carefully controlled to maintain the slip deflocculated and in quiescent (or unagitated) condition during the drying. Drying the slip under these conditions is apparently necessary to the production of a dried material in which the individual colloidally dimensioned attapulgite needles are aligned in a manner such that when the mass is ground the resultant microscopic particles are distinctly elongated and have an exceptionally low density.

The unique magnesium aluminum silicate product of this invention when ground to minus 200 mesh may be distinctly discerned in an optical microscope at 810× magnification, for example, as discrete or clustered elongated particles, similar to fibers or rods. The fibers comprise aggregates of hydrous attapulgite particles and a small quantity of deflocculating agent. These fibers are distinguished from the ultimate colloidally dimensioned attapulgite particles composing the fibers. By way of illustration, attapulgite crystals have a maximum length of 4 to 5 microns, a thickness of 50 to 100 A. and a width two or three times the thickness. As mentioned, these particles are too small to be observed in an optical microscope and are visible only in an electron microscope. In contrast, the fiberlike particles of the product of this invention have a width which varies from about 2 to about 5 microns and a length which varies from about 5 to about 50 microns. The predominating quantity of fibers in a typical sample has a width of from about 2 to 3 microns and a length within the range of about 10 to 20 microns.

The attapulgite product of this invention has an exceptionally low bulk density. By way of example, raw attapulgite clay which has been air dried to a V.M. of about 16 to 20 percent has a tamped bulk density of about 25 to 35 pounds per cubic foot. My product has a tamped bulk density of only 6 to 10 pounds per cubic foot. Attapulgite clay which has been colloidally dispersed in the presence of a deflocculating agent, and then the deflocculated slip dried under turbulent conditions, as by boiling the slip, spray drying the slip or the like, has a tamped bulk density of about 15 to 20 pounds per cubic foot. The density of extruded clay is in the neighborhood of 30 pounds per cubic foot. The term "tamped bulk density" as used herein refers to values obtained by the settling method described in U.S. 2,480,753 to William S. W. McCarter.

The product of the present invention is especially useful as an ingredient of tobacco preparations and serves the purpose of reducing the tar content of the tobacco smoke. Spectacular tar reduction has been realized when a small amount of the novel magnesium aluminum silicate adsorbent is uniformly mixed with the tobacco shreds in a cigarette. The adsorbent is employed in amount of about 3 to 10 percent. In such use, the novel attapulgite 1 to 20 percent of the tobacco weight and preferably about product should be in the form of a fine powder, for example, 100 percent by weight minus 200 mesh. The attapulgite product of this invention is materially superior in reducing the tar content of tobacco smoke to the naturally occurring clay, as will be shown hereafter. Cigarettes containing the novel attapulgite product mixed with the tobacco may be provided with an integral filter tip forming one end of the cigarette. The filter tip will supplement the tar reducing action of the attapulgite product and also minimize any tendency of particles of the attapulgite product to be drawn into the smoker's mouth.

Although I do not wish to be limited to any theory or hypothesis as to why the "wet" procedure of the invention produces a unique form of clay, the results of extensive experimentation indicate that the evaporation of water from a quiescent, deflocculated colloidal dispersion of attapulgite clay in the presence of the alkaline deflocculating agent sets the colloidally dimensioned attapulgite needles into an orderly pattern in which the colloidal needles containing adsorbed deflocculating agent are oriented in alignment with each other, as opposed to the irregular brush-heap orientation of attapulgite needles either in the usual agglomerates formed by drying simple clay slips or present in raw clay.

More specifically, the clay employed as a starting material in the production of the novel adsorbent of the present invention is attapulgite clay in its natural hydrous crystalline form. The clay may be raw clay for reasons of economy, although clay which has been refined to eliminate coarse lumps, iron, quartz, or other impurities may be employed. It is reasonable to expect that sepiolite clay may also be used with the same results obtained with the attapulgite clay. The mineral sepiolite has the same unique acicular crystalline structure as attapulgite and differs from the latter principally in that magnesium proxies for much or all of the aluminum in the attapulgite lattice. Kaolin clay and bentonite clay, which are composed of layerlike minerals, do not produce the desired fiberlike product when processed in accordance with the method of the present invention.

Raw attapulgite clay has a free moisture content which is usually about 38 percent and a volatile matter content of about 48 percent. If desired, the starting clay may be one which has been dried somewhat, as to a volatile matter content of about 17 to 30 percent. When the clay is dried to a volatile matter content less than about 17 percent, the clay undergoes irreversible loss or impairment of its colloidal properties and is not useful in the practice of the present invention which entails the use of colloidal clay.

The clay is crushed, as to minus 4 mesh or finer, and is slipped with water containing a deflocculating agent in a vessel provided with means for agitating the slip. If desired, the deflocculating agent may be added to an undispersed clay slip or the undispersed clay slip may be added to a solution of deflocculating agent. Preferably, the clay solids content of the deflocculated clay slip is from about 14 percent to about 20 percent of the weight of the slip, calculated on a volatile free clay basis. Slips as dilute as 10 percent volatile free clay solids may be used although the necessity for drying the larger quantity of water in subsequent processing will adversely affect the economy of such operation. Slips as concentrated as about 25 percent (based on the volatile free clay weight) may be used, although the ultimate product may not be as good as the product prepared utilizing a less concentrated slip. This may be explained by the importance of dispersing the attapulgite aggregates substantially completely into their ultimate colloidally dimensioned particles during the slipping step. Obviously, the use of insufficient water in the slipping step will favor the presence of undispersed particles.

As mentioned, a deflocculating agent such as, for example, sodium silicate or tetrasodium pyrophosphate (TSPP) is employed to deflocculate the colloidal attapulgite particles which possess interparticle attraction in the absence of the deflocculating agent. The deflocculating agent neutralizes or eliminates the interparticle attraction with a degree of efficiency which depends on the concentration and capacity of the deflocculating agent. The action of the deflocculator on the clay-water slip is manifested by a marked thinning of the slip when the deflocculating agent is incorporated therein. The deflocculating agent is used in an amount typically within the range of about 1.0 percent to about 5.0 percent, based on volatile free weight of the clay. Particularly good results have been obtained using tetrasodium pyrophosphate in amounts of about 2.4 percent, based on the volatile free weight of the clay. In general, it may be said that the optimum quantity of deflocculating agent is that which results in an aqueous slip of minimum viscosity. The clay content of the slip will also influence the optimum quantity of deflocculator. Other materials used by the clay industry as deflocculating agents may also be used in case simple experimentation indicates that sufficiently fluid slips of the desired solids level can be produced with these deflocculators. As examples of such deflocculating agents may be cited disodium dihydrogen pyrophosphate, sodium tripolyphosphate, sodium lignosulfonate, sodium salts of condensed naphthalene sulfonic acids and corresponding potassium and lithium compounds when they are sufficiently soluble.

Employing the preferred tetrasodium pyrophosphate deflocculating agent, it will be advantageous to incorporate a small quantity of alkali, especially sodium hydroxide, to increase the pH of the slip to about 10–11 if drying is to be conducted at temperatures close to the boiling point of the slip. This is done in order to permit the slip to be dried at temperatures close to the boiling point of the slip without impairing the deflocculating action of the tetrasodium pyrophosphate. From about 0.25 percent to 1 percent of NaOH, based on the V.F. clay weight, will suffice. Large quantities of NaOH, such as 4 to 5 percent of the V.F. clay weight, are to be avoided since this results in the production of a dense product which does not consist of the desired fiberlike particles.

A small amount of a water-soluble soap or other dispersible surface active agent may be mixed in the deflocculated clay slip, if desired. The surface active agent, which may be anionic, nonionic, or cationic, appears to enhance the dispersion of the clay, although its use is not essential in the process. Satisfactory products have been obtained in the absence of added soap or surfactant when care was taken to insure good dispersion of the clay in the water containing the deflocculating agent. When employed, the quantity of surface active agent is small, typically from 0.10 percent to 5.0 percent, based on the volatile free weight of the clay.

The deflocculated aqueous slip of clay is a mass of fluid consistency. A thin layer of the slip, such as, for example, a one-half or two-inch layer, is then dried to a grindable consistency by evaporating water from the slip. The slip is not agitated during drying. Drying is conducted at a temperature below which the slip boils since boiling agitates the slip and prevents the production of the desired product. Excellent results have been obtained by drying the slip at atmospheric pressure at 100° F. to 200° F. in a tray dryer. Spray drying, as well as other drying methods in which the slip is in turbulent state during drying, has been unsatisfactory inasmuch as dense agglomerates are produced rather than the desired light fibers. The drying conditions I employ will suffice to eliminate free moisture, but not water of hydration from the clay. The latter is eliminated from the clay at temperatures of the order of 350° F. or higher. The clay may be dried to a V.M. as low as about 10 percent and is preferably dried to a V.M. within the range of about 12 to 30 percent. Material dried to a V.M. of about 10 percent may produce excessive fines (e.g., particles finer than about 2 microns) during the subsequent milling step, whereas material having a V.M. considerably greater than 30 percent may be difficult to grind to the desired degree of fineness. However, by appropriate choice of grinding equipment, drying to a V.M. higher than 30 percent may be satisfactory. The particle size desired in the product will determine the optimum V.M. of the dried material. Drying may be conducted at atmospheric pressure or under vacuum, as desired.

Although filtration or electrical dewatering might suggest themselves as alternative methods for dewatering the slip, it has been found that the desired ultimate microscopic fibrous product will not be produced when the slip is dewatered by such methods. This observation corroborates the belief that evaporation of water from the unagitated dispersed slip results in a more ordered, probably layerlike reorientation of aligned individual attapulgite particles containing adsorbed deflocculating agent, much like asbestos aggregates. Filtration would be expected to inhibit such an orderly reorientation as a result of compression on the particles during the dewatering of the slip, as would gelation of the slip.

The dried material is then crushed and thereafter ground to the desired particle size in a suitable mill, such as a hammer mill.

For some applications it may be desirable to activate the milled product by calcining it at a temperature of about 300° F. to 1000° F. for a time sufficient to reduce the product V.M. to about 2 to 6 percent. The calcination is preferably carried out below the temperature at which the mass is virtually completely dehydrated and sintering begins since such severe calcination seriously impairs the adsorbent properties of the material and its effectiveness as an ingredient of tobacco preparations.

The following examples are given to illustrate further the present invention.

EXAMPLE I

Minus 4 mesh raw attapulgite clay from a deposit near Attapulgus, Georgia, was used in producing an adsorbent product of this invention. The clay was slipped at room temperature for about 5 minutes in a large Waring Blendor at an 18 percent by weight clay solids level (based on the volatile free weight of the clay) in a dilute aqueous solution of tetrasodium pyrophosphate. The tetrasodium pyrophosphate was present in the amount of 2.4 percent, based on the volatile free weight of the clay in the slip. The resultant fluid slip was then conditioned at room temperature for 5 minutes in the Waring Blendor with the sodium soap of tall oil fatty acids, in the amount of 0.6 percent of the volatile free weight of the clay in the slip. The conditioned slip had a thin, creamlike consistency with a small amount of foam on the surface only. Portions of the slip were tray dried overnight (in a layer 1" deep) in an oven held at 100° F. to a V.M. of 12 to 16 percent. The dried slips were mixed, crushed in a roller mill and then ground in a high speed hammer mill using a 0.027-inch screen.

The minus 200 mesh product appeared under an optical microscope as elongated particles. The average equivalent spherical diameter of the product (Casagrande method) was about 16 microns, and the tamped bulk density was 8 pounds per cubic foot. Most of the particles in the product were about 2 to 3 microns wide and about 10 to 20 microns long.

EXAMPLE II

This example illustrates the preparation of another adsorbent of the present invention.

Raw attapulgite clay from a deposit near Attapulgus, Georgia, was dispersed at an 18 percent solids level in water having dissolved therein tetrasodium pyrophosphate in amount of 2.8 percent (based on the volatile free clay weight) and 0.5 percent NaOH (based on the volatile free clay weight). A Denver Super Agitator was used in the slipping step. The slip was placed in trays to a depth of one-inch and dried for about 16 hours in an oven held at 160° F. The V.M. content of the dried material was 15.6 percent. A portion of the dried material was crushed in a roller mill and ground in a closed circuit Mikro-pulverizer using a 0.020-inch screen. The bulk density of this product was 9.1 pounds per cubic foot. Another portion of the slip was crushed and ground in a Raymond hammer mill, closed circuit, using a 0.024-inch screen. The bulk density of this product was 9.3 pounds per cubic foot.

EXAMPLE III

This example illustrates the exceptional effectiveness of products of this invention as ingredients of tobacco preparations, and shows also the superiority of these products to other attapulgite products.

Tests were conducted to demonstrate that the total quantity of tar passing ino the mainstream of the smoke from a given weight of cigarette tobacco is spectacularly reduced by mixing the tobacco with products of the present invention. By way of comparison, also tested were minus 200 mesh samples of the same attapulgite starting clay which had been dried or calcined to various V.M. contents indicated in the table without slipping or dispersing the clay; these clays are grouped as "dry" processed clays.

A blend of Turkish and domestic cigarette tobacco supplied under the trade name "Bugler" was used in all of the smoking experiments.

Experimental cigarettes were prepared by uniformly mixing tobacco shreds with 5 to 10 percent (based on the weight of the tobacco shreds) of the various attapulgite products and then packing sufficient of the mixture in cigarette paper wrapper so that each cigarette contained about 0.90 gram of the tobacco shreds. Each cigarette wrapper weighed approximately 60 milligrams. Control cigarettes containing about 0.90 gram of the tobacco per cigarette were prepared. All cigarettes were conditioned at least 18 hours at 24° C. and 58 percent R.H. before smoking.

All cigarettes were mechanically smoked by the method described in detail in Industrial and Engineering Chemistry, vol. 28, No. 7, pp. 836–839 (1936), in an article entitled "Nature of Cigarette Smoke-Technic of Experimental Smoking," J. A. Bradford et al.

Cigarettes were smoked individually employing a constant puff of about 2 seconds' duration, once each minute, and with sufficient puffs to leave a butt of about 22 mm. The smoke from 5 replicas of each cigarette composition was collected in a gloss-wool trap packed to give a 40 cm. water pressure drop at the flow rate of 1050 cc. of air per minute. The trap was shown to collect at least 95 percent of the nonvolatile components of the smoke. The trap was evacuated for 20 minutes and weighed. The weight increase divided by 5 was reported as the milligrams of tar per cigarette.

The results reported in the accompanying table show that the products of the invention are markedly superior in their ability to reduce tar to other attapulgite products. At the 5 percent level, the products of Example I and Example II, which were produced in accordance with my invention, reduced tars by 20.2 percent and 26.3 percent as compared with reductions of only 3.7 percent and 12.8 percent, and an increase of 0.6 percent for dry processed attapulgite clay outside the scope of my invention. My novel adsorbent gave a tar reduction of 42.4 percent at the 10 percent level as compared with only 25 percent for a clay outside the scope of my invention. The pressure drop during smoking of the cigarettes of the invention was comparable with that of the control cigarettes. Also, it was found that the number of puffs employed in smoking the cigarettes of this invention to the desired butt length was substantially the same as was required to smoke the control cigarettes to the same butt length.

*The Effect of Mixing Finely Divided Attapulgite Clay Products With Smoking Tobacco on the Total Tar Content of Cigarette Smoke*

CIGARETTES CONTAINING "WET" PROCESSED ATTAPULGITE CLAY PRODUCTS

| Composition of Cigarette | Average Tars Per Cigarette (mg./cig.) | Percent Tar Reduction |
|---|---|---|
| Control Cigarette (no additive) | 34.9 | |
| Cigarette Containing 5% of Product of Example I | 27.8 | 20.2 |
| Cigarette Containing 5% of Product of Example II ² | 25.7 | 26.3 |
| Cigarette Containing 10% of Product of Example II ³ | 20.1 | 42.4 |

*The Effect of Mixing Finely Divided Attapulgite Clay Products With Smoking Tobacco on the Total Tar Content of Cigarette Smoke—Continued*

CIGARETTES CONTAINING "DRY" PROCESSED ATTAPULGITE CLAY PRODUCTS

| Composition of Cigarette | Average Tars Per Cigarette (mg./cig.) | Percent Tar Reduction |
| --- | --- | --- |
| Control Cigarette (no additive) | 35.3 | |
| Cigarette Containing 5% of Raw Attapulgite Clay Dried at 250–300° F. to V. M. of 20% | 34.0 | 3.7 |
| Cigarette Containing 5% of Raw Attapulgite Clay Calcined at 700° F./1½ hr. to V. M. of 4.4% | 35.5 | ¹(0.6) |
| Cigarette Containing 5% of Raw Attapulgite Clay Calcined at 400° F./1½ hr. to V. M. of 11% | 30.8 | 12.8 |
| Cigarette Containing 10% Raw Attapulgite Clay Calcined at 400° F./1½ hr. to V. M. of 11% | 26.5 | 25.0 |

¹ Bracketed figure indicates tar increase.
² Raymond hammer milled, 0.024-inch screen.
³ Micropulverized, 0.020-inch screen.

I claim:

1. A novel adsorbent comprising aggregates of a clay selected from the group consisting of hydrous attapulgite clay and hydrous sepiolite clay, which clay had been colloidally dispersed in water in the presence of a deflocculating agent, said aggregates being further characterized by being in the form of microscopic fibers and having a tamped bulk density of 6 to 10 pounds per cubic foot.

2. A novel adsorbent comprising aggregates of hydrous attapulgite clay which had been colloidally dispersed in water in the presence of a deflocculating agent, said aggregates being further characterized by being in the form of microscopic fibers and having a tamped bulk density of 6 to 10 pounds per cubic foot.

3. A novel adsorbent comprising aggregates of a clay selected from the group consisting of hydrous attapulgite clay and hydrous sepiolite clay, which clay had been colloidally dispersed in water in the presence of tetrasodium pyrophosphate, said aggregates being further characterized by being in the form of microscopic fibers and having a tamped bulk density of 6 to 10 pounds per cubic foot.

4. A novel adsorbent comprising aggregates of hydrous attapulgite clay which had been colloidally dispersed in water in the presence of tetrasodium pyrophosphate, said aggregates being further characterized by being in the form of microscopic fibers and having a tamped bulk density of 6 to 10 pounds per cubic foot.

5. Elongated particles having a width from about 2 to about 5 microns and a length from about 5 to 50 microns and comprising aggregates of hydrous attapulgite clay which had been colloidally dispersed in water in the presence of a small amount of a deflocculating agent for said clay and then mildly dried, said particles being further characterized by having a tamped bulk density within the limits of 6 to 10 pounds per cubic foot.

6. Elongated particles having a width from about 2 to about 5 microns and a length from about 5 to 50 microns and comprising aggregates of hydrous attapulgite clay which had been colloidally dispersed in water in the presence of a small amount of tetrasodium pyrophosphate and then mildly dried, said particles being further characterized by having a tamped bulk density within the limits of 6 to 10 pounds per cubic foot.

7. A smoking preparation comprising smoking tobacco and a small amount of the composition of claim 1, sufficient to reduce the tar content of the smoke effluent from said tobacco when smoked.

8. A smoking preparation comprising smoking tobacco and a small amount of the composition of claim 6, sufficient to reduce the tar content of the smoke effluent from said tobacco when smoked.

9. A smoking preparation comprising an apparently uniform mixture of shreds of smoking tobacco with a small amount of the composition of claim 1, sufficient to reduce the tar content of the smoke effluent from said tobacco when smoked.

10. A smoking preparation comprising an apparently uniform mixture of shreds of smoking tobacco with a small amount of the composition of claim 6, sufficient to reduce the tar content of the smoke effluent from said tobacco when smoked.

11. A method of making an adsorbent which comprises essentially the steps of forming an aqueous colloidal dispersion of a material selected from the group consisting of colloidal attapulgite clay and colloidal sepiolite clay, containing a small amount of deflucculating agent for said clay, evaporating water from said dispersion to form a solid mass of grindable consistency while maintaining said dispersion deflocculated and in quiescent condition, and then grinding the evaporated mass.

12. The method of claim 11 in which said deflocculating agent is tetrasodium pyrophosphate.

13. A method of making an adsorbent from colloidal attapulgite clay which comprises essentially the steps of forming an aqueous colloidal dispersion of attapulgite clay containing a small amount of tetrasodium pyrophosphate as a deflocculating agent for said clay, evaporating water from said dispersion to form a solid mass of grindable consistency of a temperature below which said dispersion boils and while avoiding agitating said dispersion, and then grinding the evaporated mass.

14. A method of making an adsorbent which comprises essentially the steps of forming a thin fluid colloidal aqueous dispersion of attapulgite clay containing tetrasodium pyrophosphate in amount sufficient to deflocculate the dispersion, incorporating NaOH in said dispersion in amount sufficient to adjust the pH of said dispersion to a value of 10–11, evaporating water from said deflocculated dispersion to form a solid mass having a V.M. within the limits of 10 to 30 percent at a temperature below which said dispersion boils and without otherwise agitating said dispersion, and grinding the evaporated mass.

References Cited in the file of this patent

UNITED STATES PATENTS

| 1,438,587 | Feldenheimer | Dec. 12, 1922 |
| 1,438,588 | Feldenheimer | Dec. 12, 1922 |
| 2,933,420 | Haden | Apr. 19, 1960 |

UNITED STATES PATENT OFFICE
CERTIFICATE OF CORRECTION

Patent No. 3,049,449                                August 14, 1962

Aldo P. Allegrini

It is hereby certified that error appears in the above numbered patent requiring correction and that the said Letters Patent should read as corrected below.

Column 2, lines 52 and 53, for "3 to 10 percent. In such use, the novel attapulgite 1 to 20 percent of the tobacco weight and preferably about" read -- 1 to 20 percent of the tobacco weight and preferably about 3 to 10 percent. In such use, the novel attapulgite --.

Signed and sealed this 11th day of December 1962.

(SEAL)
Attest:

ERNEST W. SWIDER                              DAVID L. LADD
Attesting Officer                                 Commissioner of Patents